R. B. HENDERSON.
Rotary Cultivator.
No. 63,246.
2 Sheets—Sheet 1.
Patented Mar 26, 1867.
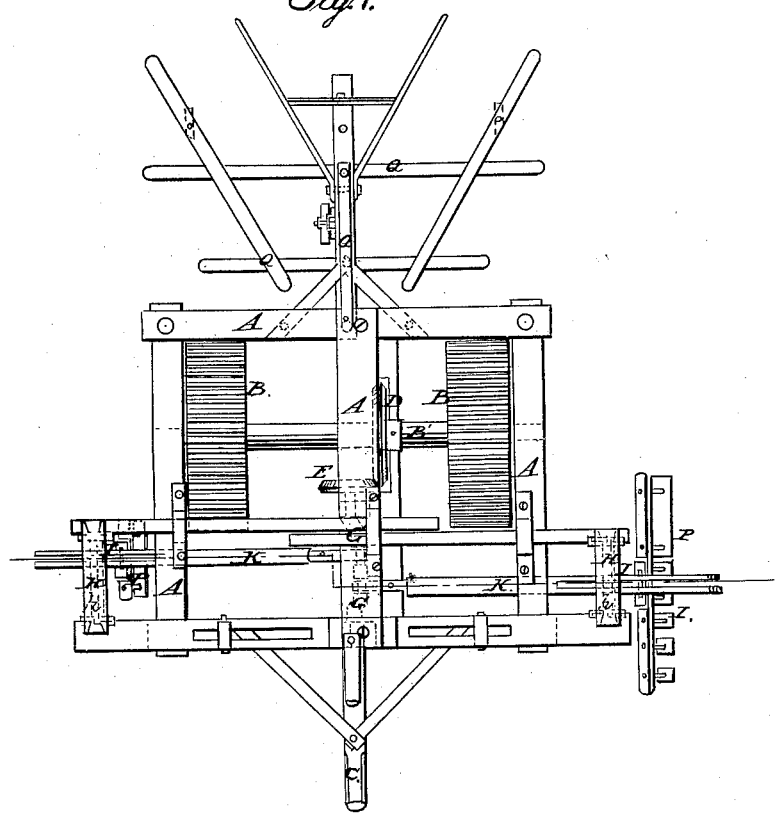
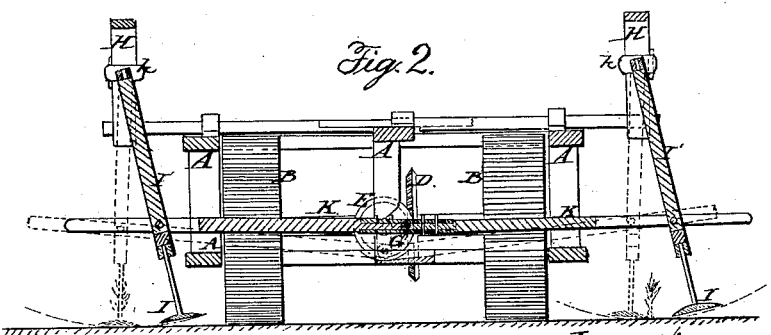

2 Sheets—Sheet 2.
R. B. HENDERSON.
Rotary Cultivator.
No. 63,246.
Patented Mar 26, 1867.
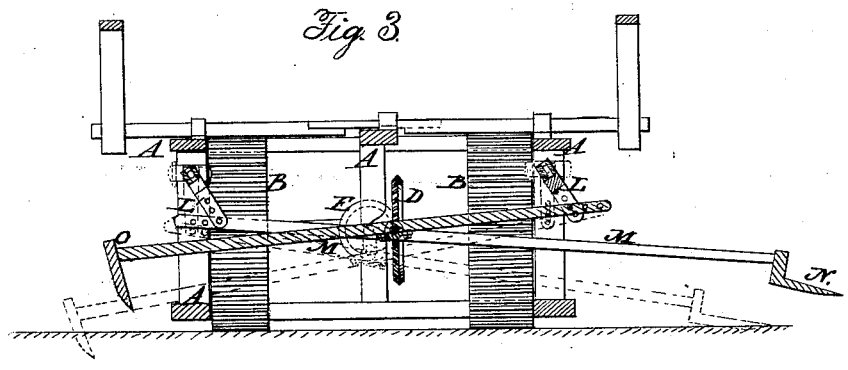
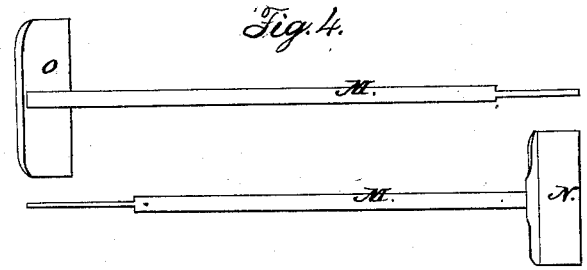

United States Patent Office.

RICHARD B. HENDERSON, OF WARREN COUNTY, NORTH CAROLINA.

*Letters Patent No. 63,246, dated March 26, 1867.*

IMPROVEMENT IN COTTON CULTIVATOR.

*The Schedule referred to in these Letters Patent and making part of the same.*

TO ALL WHOM IT MAY CONCERN:

Be it known that I, RICHARD B. HENDERSON, of the county of Warren, and in the State of North Carolina, have invented a new and useful "Machine for Thinning and Cutting Out Cotton (or other) Plants, and Ploughing or Harrowing into the Soil the Plants which are cut out;" and I do hereby declare that the following is a full, clear, and exact description thereof, reference being had to the accompanying drawings, making a part of this specification.

My machine, which I claim to be a new invention and not a mere improvement, is more particularly intended for use in cotton culture; it may, however, be found of use in the culture of other plants. The object of my machine is to "thin out" a majority of the young cotton plants, so that those which remain may attain to a greater size and strength. The ordinary mode of planting cotton is by sowing or drilling it in rows varying from three and a half to five feet apart; if the seed have been drilled they are planted about half an inch apart. When the young plants have attained a height of three or four inches, (it being supposed that all the seed have then come up,) it becomes necessary to do what is termed by planters "bringing the cotton to a stand;" this is ordinarily effected by manual labor with a hoe of a certain desired width, so that each stroke of the hoe will remove a certain width or swath of young plants, say eight inches; the next stroke is made say ten inches farther on, so as to leave standing, or "at a proper stand," about two inches of the plants. A suitable time afterwards all of the plants are removed by hand or by hoe, except one for (say) every eight inches. These two operations of thinning and cutting out the cotton must be done rapidly and at the proper instant, and it is desirable to do so more rapidly than can be done by hand. My machine may be so constructed as to be drawn between two rows and thin them both out at the same time, as shown in the drawings; or by a simple variation of the framework it may be drawn astraddle over and operate upon only one row. In the drawings—

Figure 1 is a plan view.

Figure 2 is an end view showing the operation of the pendulum hoe.

Figure 3 is an end view showing the mode of operating the common hoe, and also the shovel hoe.

Figure 4 shows the common hoe and the shovel hoe.

A represents the framework of my machine. This is a box-frame made of a suitable size to run between two rows, and may be about sixteen inches square and twelve inches deep. Heavy timber or cast iron may be used, and it may be built either with or without a seat for the driver. B are the wheels (say sixteen inches in diameter) upon which the machine runs; they are ribbed on their periphery so as to take hold upon the ground. C is the tongue by which the machine is drawn along. D is a bevel gear-wheel upon the main axle B', through which power is communicated to the hoes. E is a bevelled pinion driven by wheel D, and is fast to the bell-crank G. Each machine may be furnished with several of these pinions, E, of different numbers of teeth, so as to regulate the rapidity of the crank-motion by simply changing the pinion. G is a bell-crank at the forward end of the machine, having a stroke of some six inches. H H are two extension frames, sliding on the top of the frame A, so as to be capable of increasing the effective width of the machine according to the width between the rows where the instrument is used. h h are oscillating shafts in frames H, from which depend the pendulum hoes I. I I are the "pendulum hoes," and consist each of a hoe-blade of the desired width and shape, as seen in figs. 1 and 2. These blades, which may be about two inches wide and eight inches long, are provided with handles, I', extending upwards and at right angles with the face of the blade; these handles are about twenty inches long, and are fast by their upper ends to the shafts h h. K K are two pitman-rods, having their inner ends fixed to the bell-crank G, and their outer ends to the middle of the hoe-handles I. From the construction thus described, it is obvious that as the machine is drawn along power is communicated from the wheels B, D, and E to the crank G, which, through pitmens K, oscillates the two pendulum hoes I in such a manner as to make them cut away the cotton plants against which they strike, as shown by red lines in fig. 2. These hoes may cut from between the rows outward or inward, or both outward and inward. There are various modes of thinning out the plants by means of a lateral movement of hoes attached to a machine drawn between rows, but I prefer the mode shown in fig. 2. In fig. 3 is shown a different mode of operating the hoes. L L are short pendulum shafts fastened to the frame A, as shown in fig. 3. M M are long handles affixed either to a shovel hoe, N, or common hoe, O. Near the centre of these handles are boxes which fit on the bell-crank G. It will thus be seen that the revolution of the crank oscillates the two hoes; making them cut away the plants against which they come in contact. The shovel hoe N cuts from the centre outward, while the common hoe O cuts inward. By means of holes and pins in the handles M and pendulums L the length of stroke may be varied. P represents another form of thinning hoe. This hoe consists of a number of small blades, some five or six, each about an inch long and an inch apart, as shown in fig. 1. At one end of this hoe is a larger blade, equal in width to half the length of all the small blades and their intermediate spaces. This hoe is to operate by either of the modes shown in figs. 2 or 3. As this hoe makes the first stroke its wide blade will cut away say four inches of plants, and the series of small blades will cut out in alternate spaces a width of say eight inches. At the next stroke the wide blade will cut out half of the plants left in the eight-inch space, so that the result will be that in every twelve inches four inches of plants will be cut away entirely, and that in eight inches they will be thinned out one-half. Q is an adjustable cultivator, which may be provided either with shovels, ploughs, or harrow teeth, and is intended to plough in and cover up the plants after they are cut out, and at the same time serves to plough up and kill all the grass between the rows. I have described several kinds of hoes capable of being used with my machine, but do not desire to limit my claim to their use, as it is obvious that hoes of a great variety of forms may be used.

Having fully described my invention, what I claim as new, and desire to secure by Letters Patent, is—

1. The frame A running on wheels B, and operating in combination with the hoes, substantially as and for the purposes set forth.

2. The crank G in combination with the handles M, and hoes N and O, substantially as and for the purposes set forth.

3. The hoe N, when constructed and operating substantially as and for the purposes set forth.

4. The hoe O, when constructed and operating substantially as and for the purposes set forth.

5. The hoe P, when constructed and operating substantially as and for the purposes set forth.

6. The extension frame H, when constructed and operating substantially as and for the purposes set forth.

7. The cultivator Q, in combination with the machine herein set forth.

In testimony that I claim the above-described invention I have hereunto signed my name this 16th day of January, 1867.

R. B. HENDERSON.

Witnesses:
Jo. C. CLAYTON,
V. C. CLAYTON.